United States Patent [19]
Jarboe et al.

[11] Patent Number: 5,511,818
[45] Date of Patent: Apr. 30, 1996

[54] PASSENGER SIDE AIRBAG MODULE

[75] Inventors: Patrick G. Jarboe, Shelby Township, Mich.; Terry R. Davis, Layton, Utah

[73] Assignee: Morton International, Inc., Chicago, Ill.

[21] Appl. No.: 515,563

[22] Filed: Aug. 16, 1995

[51] Int. Cl.$^6$ .................................................. B60R 21/16
[52] U.S. Cl. ........................................ 280/728.2; 280/732
[58] Field of Search ............................. 280/728.1, 728.2, 280/732, 731, 741

[56] References Cited

U.S. PATENT DOCUMENTS

| | | |
|---|---|---|
| 2,781,203 | 2/1957 | Kurilenko . |
| 3,610,657 | 10/1971 | Cole . |
| 3,853,334 | 12/1974 | Auman et al. . |
| 4,810,005 | 3/1989 | Fohl ........................................ 280/732 |
| 5,176,400 | 1/1993 | McGuire et al. ..................... 280/728.2 |
| 5,290,059 | 3/1994 | Smith et al. ......................... 280/728.2 |

*Primary Examiner*—Paul N. Dickson
*Attorney, Agent, or Firm*—George W. Rauchfuss, Jr.; Gerald K. White

[57] ABSTRACT

A passenger side airbag module includes a reaction can having a generally cylindrical sidewall and a bottom wall defining an open-topped airbag cushion storage compartment, the bottom wall including an integral annular mounting ring defining an inflator-receiving opening. A retainer has a cylindrical sleeve with a top wall extending inwardly and a retainer ring extending outwardly from the lower end of the sleeve. An airbag cushion includes an annular mounting collar which is clamped between the retainer ring and the mounting ring. An inflator has an elongated cylindrical body partially received in the cylindrical sleeve of the retainer with a gas outlet cap extending through the top wall of the retainer to deliver inflation gas to the interior of the airbag cushion. The gas outlet cap is welded to the retainer to secure the inflator. A portion of the inflator body extends below the reaction can, and the mounting collar is positioned around the inflator body to cushion against rattles. Mounting studs are provided for securing the bottom wall of the inflator to a vehicle panel.

20 Claims, 2 Drawing Sheets

PASSENGER SIDE AIRBAG MODULE

FIELD OF INVENTION

The invention herein relates to a passenger side airbag module incorporating an elongated inflator extending through the bottom wall of the reaction can thereof and a retainer which mounts the inflator and airbag cushion in the reaction can.

BACKGROUND OF INVENTION

Passenger side airbag modules generally comprise an airbag cushion, reaction can and an inflator, wherein the airbag cushion is larger than the airbag cushions used for driver's side modules due to the increased space between the occupant and the vehicle dashboard. In turn, the passenger side airbag cushion requires more inflation gas and therefore a larger inflator, usually provided as a pyrotechnic inflator in the form of an elongated cylinder with side openings for delivering inflation gas. A cooperating reaction can has the general shape of an elongated, open-topped trough, with the inflator mounted along the bottom of the trough. The airbag cushion has a mouth which is mounted to receive inflation gasses into the interior of the airbag cushion, and because of the shape of the reaction canister, the airbag mouth mounting means have become somewhat complex. For instance, they often include tubes formed along the edge of the airbag cushion mouth, wherein the tubes are received within extruded slotted openings formed in the reaction canister sidewalls, with anchor rods inserted within the airbag tubes and slotted openings for securing the airbag with its mouth held open to receive inflation gasses.

Some recent hybrid inflators are also provided with an elongated cylindrical body. The elongated cylindrical body is utilized for storing a compressed inert gas. The hybrid inflator further includes a combustible heating means for expanding and thereby increasing the pressure of the stored compressed gas, and the inflator further comprises outlet means for delivering the inflation gasses at one end of the elongated cylindrical inflator. An example of such an inflator is disclosed in U.S. Pat. No. 5,405,164 issued Apr. 11, 1995 for Hybrid Inflator Retention in Automotive Airbag Modules. Further, inflators utilizing compressed gas alone are also sometimes provided in elongated cylindrical shape with an outlet means at one end thereof. The hybrid inflator and compressed gas inflators having the elongated cylindrical shape with gas outlet means at one end are also utilized in the typical trough-shaped reaction canister for passenger side airbag module.

It would be desirable to utilize such inflators in a passenger side airbag module of reduced complexity, particularly with respect to the mounting of the airbag cushion. A reduction in the size of the passenger side airbag module would also be helpful, particularly if the size reduction reduced the area of the dashboard presenting the reaction canister and airbag cushion to the occupant of the vehicle.

SUMMARY OF INVENTION

It is a principal object of the invention herein to provide a passenger side airbag module.

It is an additional object of the invention herein to provide a passenger side airbag module comprised of a small number of relatively inexpensive parts.

It is a further object of the invention herein to provide a passenger side airbag module with simplified attachment of an airbag cushion.

It is yet another object of the invention herein to provide a passenger side airbag module which provides for efficient delivery of inflation gas to the airbag cushion.

It is a further object of the invention to provide a passenger side airbag module which is compact and which requires minimal surface on the dashboard.

In carrying out the foregoing objects of the invention herein, there is provided a passenger side airbag module comprising a reaction can having a sidewall and a bottom wall defining an open-topped airbag cushion storage compartment. The bottom wall integrally includes an annular mounting ring surrounding an inflator-receiving opening. A retainer is received within the reaction can, the retainer having an inflator-receiving sleeve, a top wall defining an opening, and a retainer ring extending outwardly from the sleeve and secured to the mounting ring of the reaction can. An airbag cushion includes a reinforced annular collar defining an inlet mouth, and the collar is clamped between the annular mounting ring of the reaction can and the retainer ring secured thereto. The airbag cushion is folded and substantially packed in the storage compartment of the reaction can for deployment from the open top thereof.

The airbag module further comprises an inflator having an elongated cylindrical body and inflation gas outlet cap at one end thereof. The inflator is secured in the retainer with the gas outlet cap extending through the opening in the top wall of the retainer. The gas outlet cap is positioned within and adapted to deliver inflation gas to the airbag cushion. The portion of the inflator body adjacent the gas outlet cap is received and supported in the inflator-receiving sleeve of the retainer and the remainder of the inflator body extends through and rearwardly from the inflator-receiving opening in the reaction can.

According to one aspect of the invention, the retainer is secured by welding to the gas outlet cap of the inflator. According to additional aspects of the invention, the retainer is mounted to the reaction can by a plurality of studs extending through openings in the mounting ring of the reaction can and secured by nuts. Further, alternate ones of the studs are elongated to extend through and secure the airbag module to a vehicle support panel.

According to other aspects of the invention, the reaction can is fabricated as a plastic part. The reaction can has tapered sidewalls of a circular cross-sectional configuration; it does not have to be circular, it can be oval or other shape. The mounting ring comprises substantially the bottom wall of the reaction can, and the retainer ring flares upwardly at its periphery for smoothly engaging the airbag cushion within the reaction can.

According to still other aspects of the invention, the airbag is slit through the collar, to admit the retainer in order to position the retainer for mounting. The periphery of the collar extends through the inflator-accommodating opening in the bottom of the reaction can, and cushions the inflator against rattles. A tearable cover is provided over the open top of the reaction can to confine and protect the airbag cushion prior to deployment.

The various features of novelty which characterize the invention are pointed out with particularity in the claims annexed to and forming a part of this specification. For a better understanding of the invention, its operating advantages and specific objects attained by its use, reference is made to the accompanying drawings and descriptive matter

DRAWINGS

The same reference numerals refer to the same elements throughout the various figures.

DESCRIPTION OF PREFERRED EMBODIMENT

Figure 1:
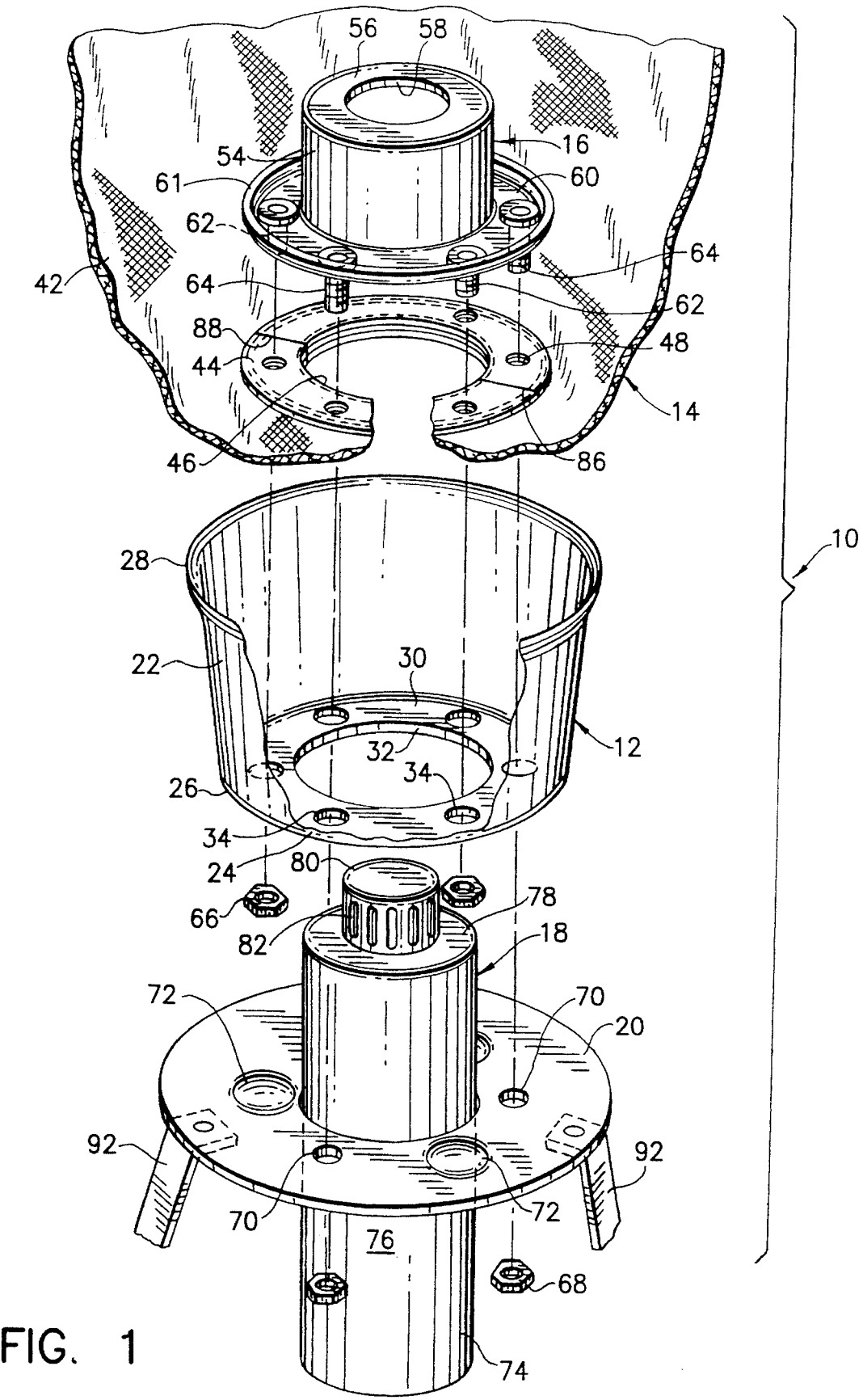
FIG. 1 is an exploded perspective view, partially cut away, of an airbag module according to the invention herein.
Figure 2:
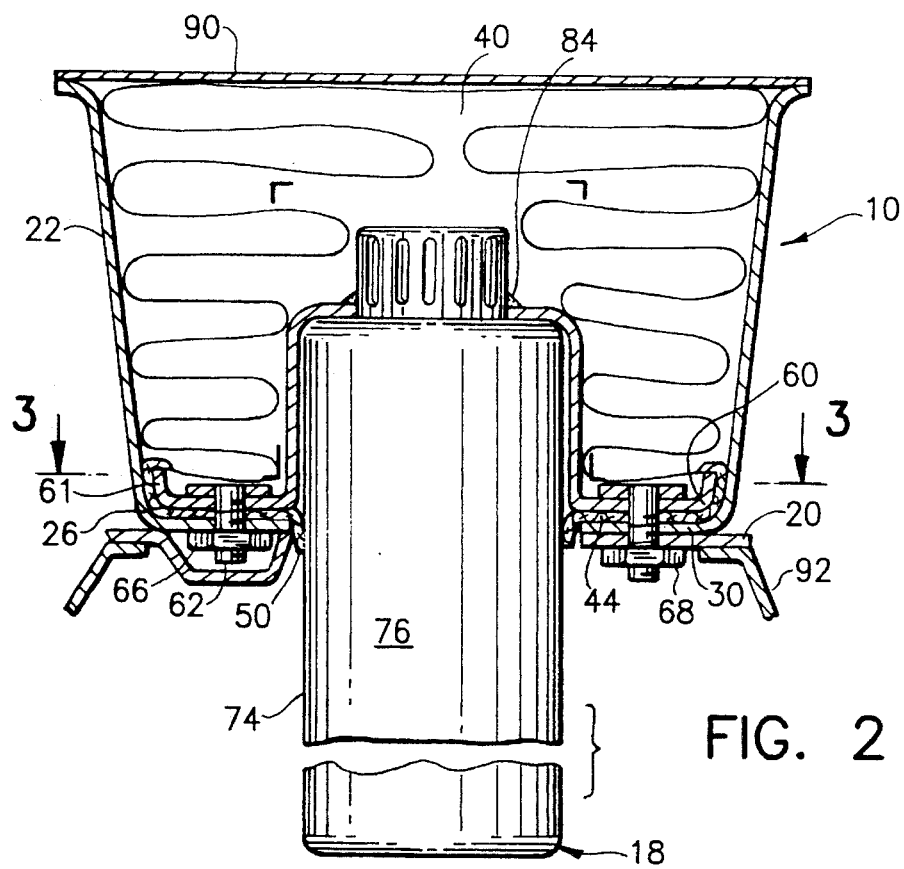
FIG. 2 is a side elevation view, partially in section, of the airbag module of FIG. 1.
Figure 3:
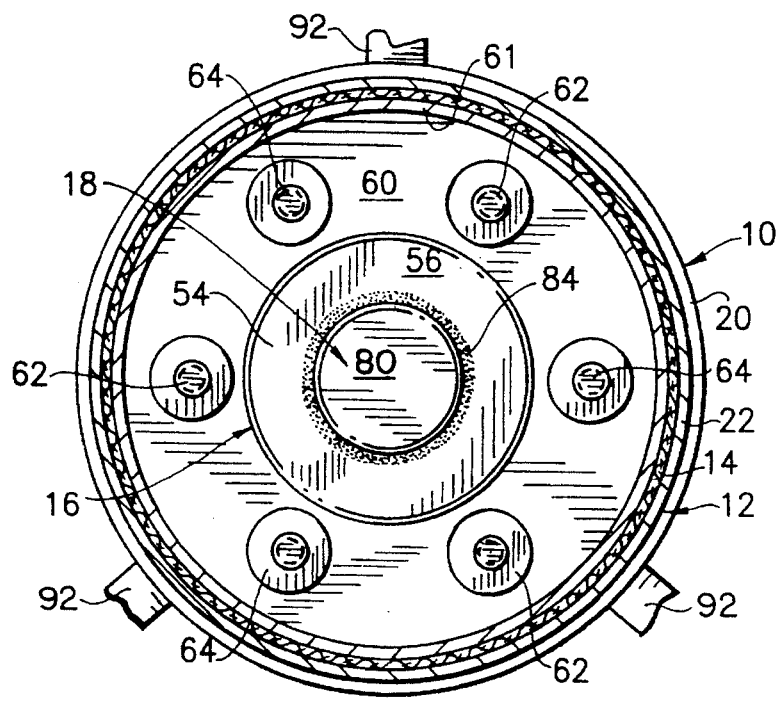
FIG. 3 is a sectional view of the airbag module of FIG. 1, taken along the lines 3—3 of FIG. 2.

An airbag module 10 according to the invention herein and shown in FIGS. 1–3 generally comprises a reaction can 12, an airbag cushion 14, a retainer 16 and an inflator 18. The airbag module 10 is mounted to a support panel 20 of a vehicle, as more fully discussed below.

The reaction can 12 of the airbag module 10 comprises a generally cylindrical sidewall 22 joined with a bottom wall 24 at a curved transition 26. The sidewall 22 has a circular cross-section, as best seen in FIG. 3, and tapers outwardly from the bottom wall 24 to a flared lip 28. The bottom wall 24 integrally comprises a mounting ring 30 defining and surrounding an inflator-receiving opening 32. The mounting ring 30 further defines six spaced-apart openings 34 surrounding the inflator-receiving opening 32. The reaction can 12 is preferably molded of a plastic material. It defines an open topped storage compartment 40 for the airbag cushion 14.

The airbag cushion 14 comprises a fabric body portion 42 and an reinforced annular collar 44 defining an inlet mouth 46. The body 42 of the airbag cushion 14 is otherwise closed, and is therefore inflatable by gasses delivered to the interior thereof. The annular collar 44 defines six spaced-apart openings 48 positioned to align with the openings 34 in the mounting ring 30, on which the reinforced annular collar 44 is received with the inlet 46 in registration with the inflator-receiving opening 32. As best seen in FIG. 2, the inner peripheral edge 50 of the annular collar 44 extends through the opening 32, covering the inside edge of the mounting ring 30.

The retainer 16 has a cylindrical sleeve 54 and a top wall 56 extending inwardly from the sleeve 54 and defining an opening 58, best seen in FIG. 1. A retainer ring 60 extends outwardly from the lower end of the sleeve 54. The retainer ring mounts a plurality of studs extending downwardly therefrom for clamping the annular collar 44 to the mounting ring 30 and thereby mounting the airbag cushion 14 within the reaction can 12. More particularly, the retaining ring mounts three short studs 62 and three longer studs 64 in alternating spaced-apart positions about the retainer ring 30 corresponding to the positions of the openings 48 in the annular collar 44 and the openings 34 in the mounting ring 32. As best seen in FIG. 2, the short studs 62 are fitted with nuts 66 which, when tightened, clamp the annular collar 44 between the mounting ring 30 and the retainer ring 60. The longer studs 64 extend through openings in the vehicle support panel 20 and are secured by nuts 68, thereby also clamping the annular collar 44 of the airbag cushion 14 between the mounting ring 30 and the retaining ring 60, and also secures the airbag module 10 to the vehicle support panel 20. With reference to FIGS. 1 and 2, the vehicle support panel 20 defines openings 70 for receiving the long studs 64 secured by the nuts 68. The vehicle support panel 20 further defines three depressions 72 which accommodate the shorter studs 62 and their nuts 66, as best seen in FIG. 2.

In the preferred embodiment shown, the mounting ring 30 comprises substantially all of the bottom 24 of the reaction can 12 and the retainer ring 60 therefor extends to the sidewall 22, with a flared periphery 61 conforming to the curved transition 26 between sidewall 22 and bottom wall 24 of the reaction can 12. However, in other embodiments the reaction can could be of lesser height and greater diameter wherein the mounting ring would comprise a lesser portion of the bottom wall. Also, the reaction can could be of oval or rectangular configuration.

The inflator 18 of the airbag module 10 comprises a body 74 having a cylindrical sidewall 76 and an upper end wall 78. An outlet cap 80 is secured to the upper end wall 78 and defines a plurality of outlet openings 82 for delivering inflation gas produced by the inflator.

The upper portion of the body 74 is received in the retainer 16, with the cylindrical sidewall 76 closely received by the retainer sleeve 54 and the end wall 78 butted against the top wall 56 of the retainer. The outlet cap 80 extends through the opening 58 in the top wall 56, and the top wall 56 and outlet cap 80 are welded together as indicated at 84 to secure the inflator and retainer together. Approximately 25–50% of the length of the inflator body 74 is received within the sleeve 54, with 40% being so received in the airbag module 10. The openings 82 are thus within the body 42 of the airbag cushion 14, such that the inflator can deliver inflation gasses to the interior of the airbag cushion. The peripheral edge 50 of the annular collar 44 which extends through the mounting ring 30 is positioned against the cylindrical sidewall 76 of the inflator, and cushions it against squeaks or rattles.

In order to assemble the airbag module 10, the inflator is first inserted into the retainer 16 and the outlet cap 80 and top wall 56 of the retainer are welded together as indicated at 84 in FIG. 2. The annular collar 44 of airbag cushion 14 is provided with two slits 86 and 88, which permits the retainer 16 and especially the extending retainer ring 60 to be inserted through the annular collar 44 into the body 42 of the airbag cushion 14. The studs 62 and 64 are pre-mounted to the retaining ring 60 and are then inserted through the openings 48 in the annular collar 44. The cylindrical body 74 of the inflator 18 is then inserted through the inflator-receiving opening 32 until the annular collar 44 and retainer ring 60 are seated on the mounting ring 30 and the studs extend through the openings 34 in the mounting ring 30. The nuts 66 are then applied to the short studs to secure the components of the airbag module 10 together.

The body 42 of the airbag cushion 14 is folded for storage in compartment 40, and a foil or plastic seal 90 is applied over the open top of the reaction can 12 to maintain the airbag cushion in folded condition within the storage compartment and protect the airbag cushion from debris and the like.

The airbag module 10 is mounted in a vehicle by inserting the three long studs 64 through the openings 70 in a vehicle support panel 20, and securing the airbag module thereto by means of nuts 68. The vehicle support panel 20 is secured to a structural member of the vehicle by means of struts 92, which position the airbag module for deployment of the airbag cushion.

The airbag module 10 operates, upon receipt of a crash sensor, by the inflator be providing inflation gas through the openings 82 of the outlet cap 80, which inflate the airbag cushion 14. The seal 90 readily bursts to permit expansion of the airbag cushion.

The airbag module 10 exhibits many advantageous features. It comprises a relatively few number of parts which are easily assembled together and in particular the airbag cushion 14 is easily and securely attached to the reaction can 12. The airbag module 10 also presents a minimal frontal area on the vehicle dashboard from which the airbag is to be deployed, which permits the dashboard to contain other desirable automotive features, such as glove box, heating and air conditioning vents, radio controls, and the like.

Accordingly, a preferred embodiment of a passenger side airbag module has been described which admirably achieves the objects of the invention herein. With reference to the description of the preferred embodiment, those skilled in the art will appreciate that modification may be made without departing from the spirit of the invention. Therefore, it is not intended that the scope of the invention be limited to the specific embodiment illustrated and described. Rather, it is intended that the scope of the invention be determined by appended claims and equivalents thereof.

We claim:

1. A passenger side airbag module comprising:
   A) a reaction can having a sidewall and a bottom wall defining an open-topped airbag cushion storage compartment, the bottom wall including an integral mounting ring defining an inflator-receiving opening;
   B) a retainer having a generally cylindrical sleeve with upper and lower ends, a top wall extending inwardly from the upper end of the cylindrical sleeve and defining an opening, and a retainer ring extending outwardly from the cylindrical sleeve and secured to the mounting ring of the reaction can with the sleeve extending upwardly from the inflator-receiving opening in the bottom wall of the reaction can;
   C) an airbag cushion including an inflatable body and a reinforced mounting collar defining a mouth, the mounting collar clamped between the mounting ring of the reaction can and the retainer ring of the retainer secured thereto with the mouth aligned with the inflator-receiving opening in the bottom wall of the reaction can, the inflatable body of the airbag cushion folded and substantially packed in the storage compartment of the reaction can for deployment from the open top thereof; and
   D) an inflator for producing inflation gas, the inflator having an elongated cylindrical body and an outlet cap at one end thereof for delivering inflation gas, the inflator secured to the retainer with the inflation gas outlet cap extending through the opening defined by the top wall of the retainer, a portion of the inflator body adjacent the gas outlet cap received in the cylindrical sleeve of the retainer and a portion of the inflator body extending through the inflator-receiving opening in the bottom wall of the reaction can and the mouth of the airbag cushion.

2. A passenger side airbag module as defined in claim 1 wherein the reaction can is of unitary one-piece construction.

3. A passenger side airbag module as defined in claim 2 wherein the reaction can is fabricated of molded plastic.

4. A passenger side airbag module as defined in claim 2 wherein the reaction can has a generally cylindrical sidewall.

5. A reaction can as defined in claim 4 wherein the generally cylindrical sidewall of the reaction can tapers outwardly from the bottom wall to the open top thereof.

6. A passenger side airbag module as defined in claim 4 wherein the sidewall of the reaction can has an outwardly flared upper lip and further comprising a seal extending across the open top of the airbag cushion storage compartment for retaining the folded airbag cushion therein prior to deployment.

7. A passenger side airbag module as defined in claim 1 wherein the retainer ring extends radially outwardly from the lower end of the cylindrical sleeve of the retainer.

8. A passenger side airbag module as defined in claim 7 wherein the mounting ring comprises substantially the entire bottom wall of the reaction can and the retainer ring substantially covers the mounting ring.

9. A passenger side airbag module as defined in claim 8 wherein the periphery of the retainer ring flares upwardly adjacent a curved transition from the bottom wall to the sidewall of the reaction can.

10. A passenger side airbag module as defined in claim 7 wherein the cylindrical sleeve of the retainer receives and embraces at least 25% of the length of the elongated cylindrical body of the inflator.

11. A passenger side airbag module as defined in claim 10 wherein the inflator is secured to the retainer by means of a weld between the gas outlet cap of the inflator and the top wall of the retainer.

12. A passenger side airbag module as defined in claim 1 wherein the inflator is secured to the retainer by means of a weld between the gas outlet cap of the inflator and the top wall of the retainer.

13. A passenger side airbag module as defined in claim 1 wherein the mounting collar of the airbag cushion has at least one slit for accommodating the retainer ring preparatory to clamping the mounting collar between the retaining ring and mounting ring.

14. A passenger side airbag as defined in claim 13 wherein a peripheral portion of the mounting collar extends through the inflator-receiving opening in the reaction can to provide cushioning between the reaction can and the inflator body.

15. A passenger side airbag as defined in claim 1 wherein a peripheral portion of the mounting collar extends through the inflator-receiving opening in the reaction can to provide cushioning between the reaction can and the inflator body.

16. A passenger side airbag module as defined in claim 1 wherein the retainer is secured to the mounting ring and the collar is clamped between the retainer ring and the mounting ring by studs extending from the retainer ring through openings defined in the collar and mounting ring and fasteners fitted to the studs.

17. A passenger side airbag module as defined in claim 16 wherein the studs are threaded and the fasteners are nuts.

18. A passenger side airbag module as defined in claim 16 wherein some of the studs are longer than others of the studs, the longer studs thereby adapted to extend through a support panel of a vehicle for mounting the airbag module thereto.

19. A passenger side airbag module comprising:
   A) a one-piece, unitary reaction can having a generally cylindrical sidewall and a bottom wall together defining an open topped airbag cushion storage compartment, the sidewall tapering outwardly from the bottom wall to the open top thereof and the bottom wall including an annular mounting ring defining an inflator-receiving opening;
   B) a retainer having a generally cylindrical sleeve with upper and lower ends, a top wall extending inwardly from the upper end of the cylindrical sleeve and defining an opening, and a retainer ring extending outwardly from the lower end of the cylindrical sleeve and having substantially the same diameter as the annular mounting ring, the retainer ring secured to the mounting ring of the reaction can by means of a plurality of spaced-apart studs extending from the retainer ring through openings defined in the annular mounting ring, with the sleeve of the retainer extending upwardly from the inflator-receiving opening in the bottom wall of the reaction can;

C) an airbag cushion including an inflatable body and reinforced mounting collar defining a mouth, the mounting collar clamped between the annular mounting ring of the reaction can and the retainer ring of the retainer, the mounting collar of the airbag including at least one slit for accommodating the retainer ring preparatory to clamping the mounting collar between the retaining ring and mounting ring; and the mounting collar defining a plurality of openings through which the studs are accommodated, the body of the airbag cushion folded and substantially packed in the storage compartment of the reaction can for deployment from the open top thereof;

D) an inflator for producing inflation gas, the inflator having an elongated cylindrical body and an outlet cap at one end thereof for delivering inflation gas, the gas outlet cap extending through the opening defined by the top wall of the retainer and welded to the top wall of the retainer, a portion of the inflator body adjacent the outlet cap received in and supported by the cylindrical sleeve of the retainer, the inflator body passing through the inflator-receiving opening in the bottom wall of the reaction can and the mouth of the airbag cushion with a further portion of the inflator body extending from the bottom of the reaction can.

20. A passenger side airbag as defined in claim 19 wherein a peripheral portion of the mounting collar extends through the inflator-receiving opening in the reaction can to provide cushioning between the reaction can and the inflator body.

* * * * *